Figure 1:
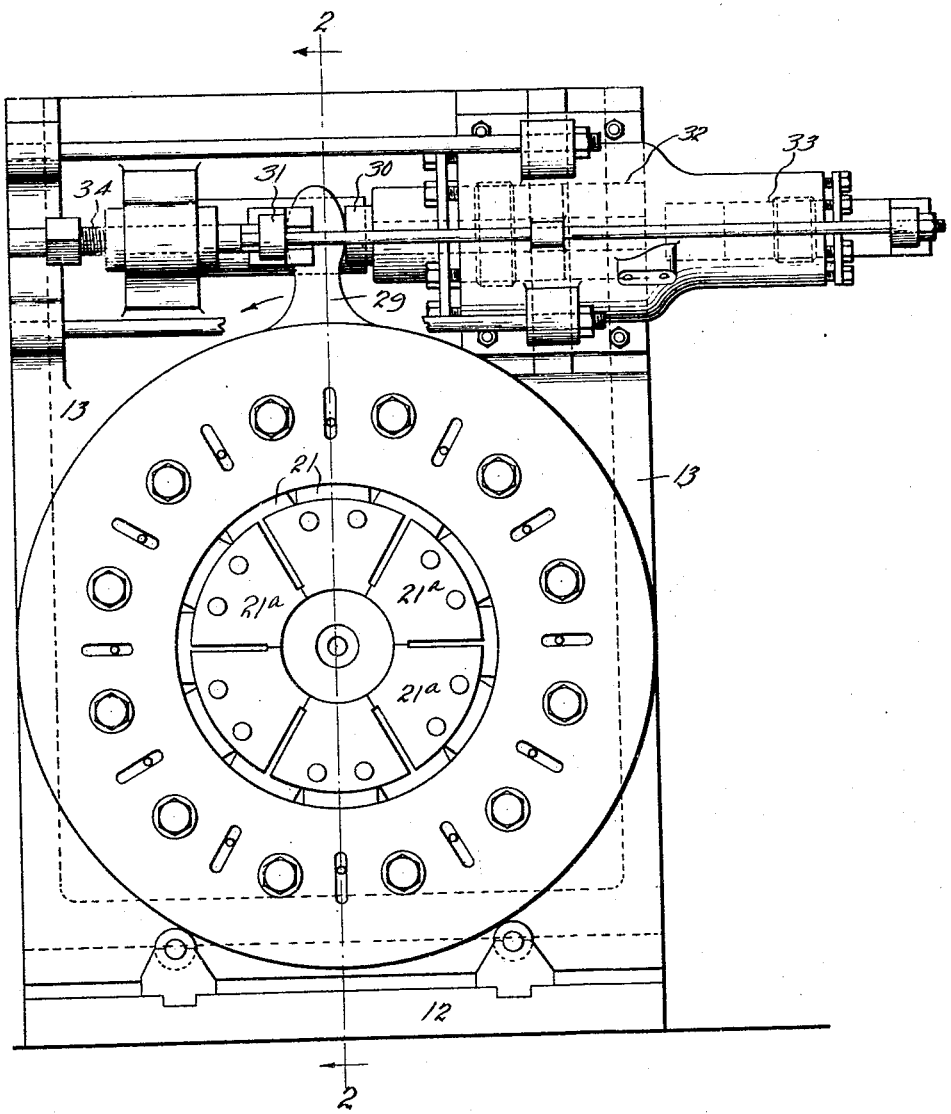

May 26, 1925.  
G. C. BRAINARD  
1,539,800  
APPARATUS FOR SHAPING AND TRUING BRAKE DRUMS  
Filed Jan. 7, 1921  5 Sheets-Sheet 1

May 26, 1925.
G. C. BRAINARD
1,539,800
APPARATUS FOR SHAPING AND TRUING BRAKE DRUMS
Filed Jan. 7, 1921 5 Sheets-Sheet 2
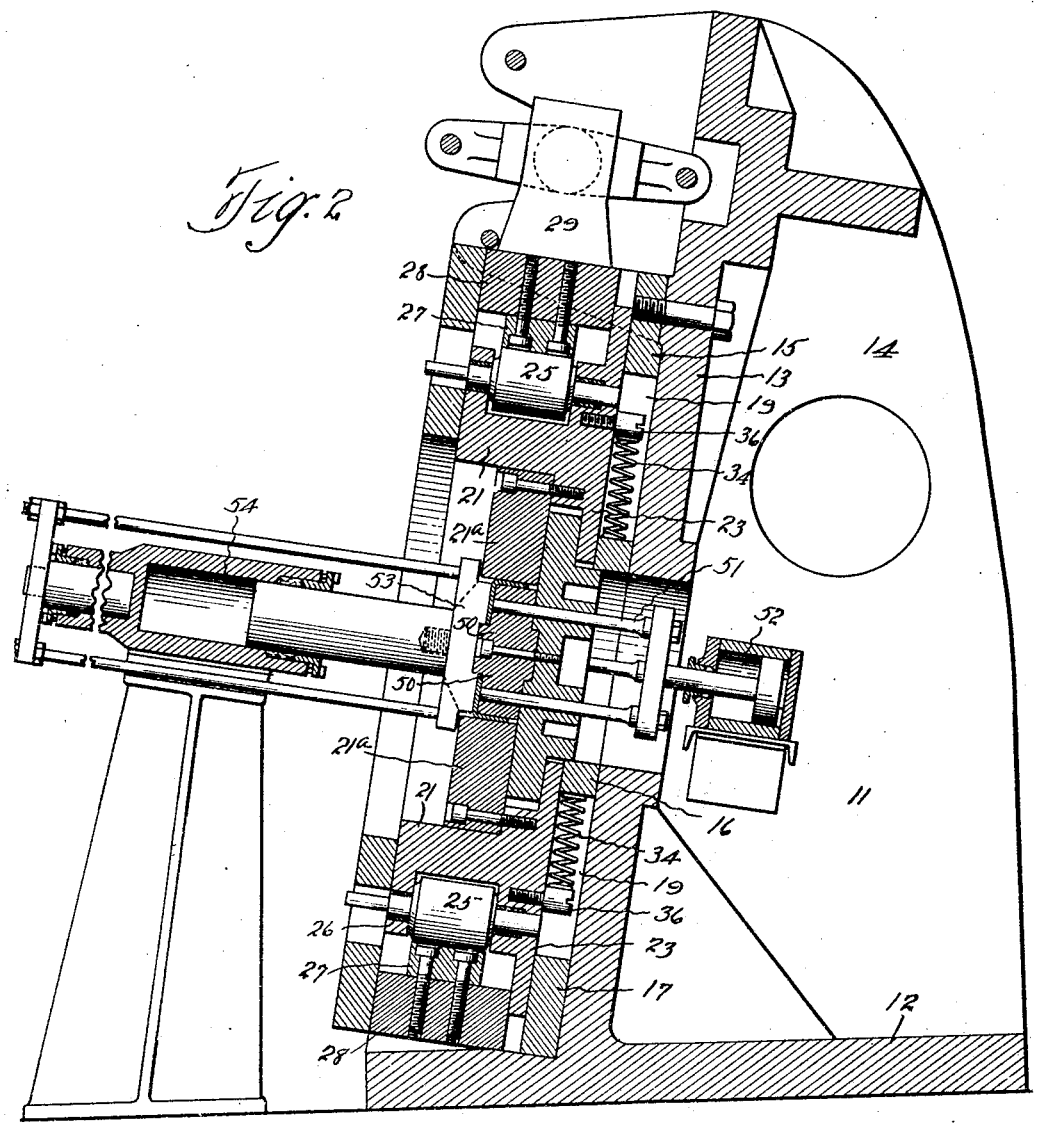
Inventor
G. C. Brainard
Attys.

May 26, 1925.
G. C. BRAINARD
APPARATUS FOR SHAPING AND TRUING BRAKE DRUMS
Filed Jan. 7, 1921     5 Sheets-Sheet 3
1,539,800
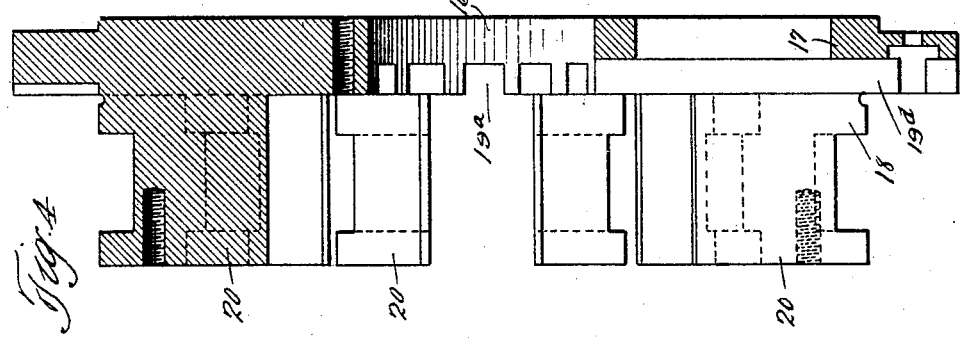
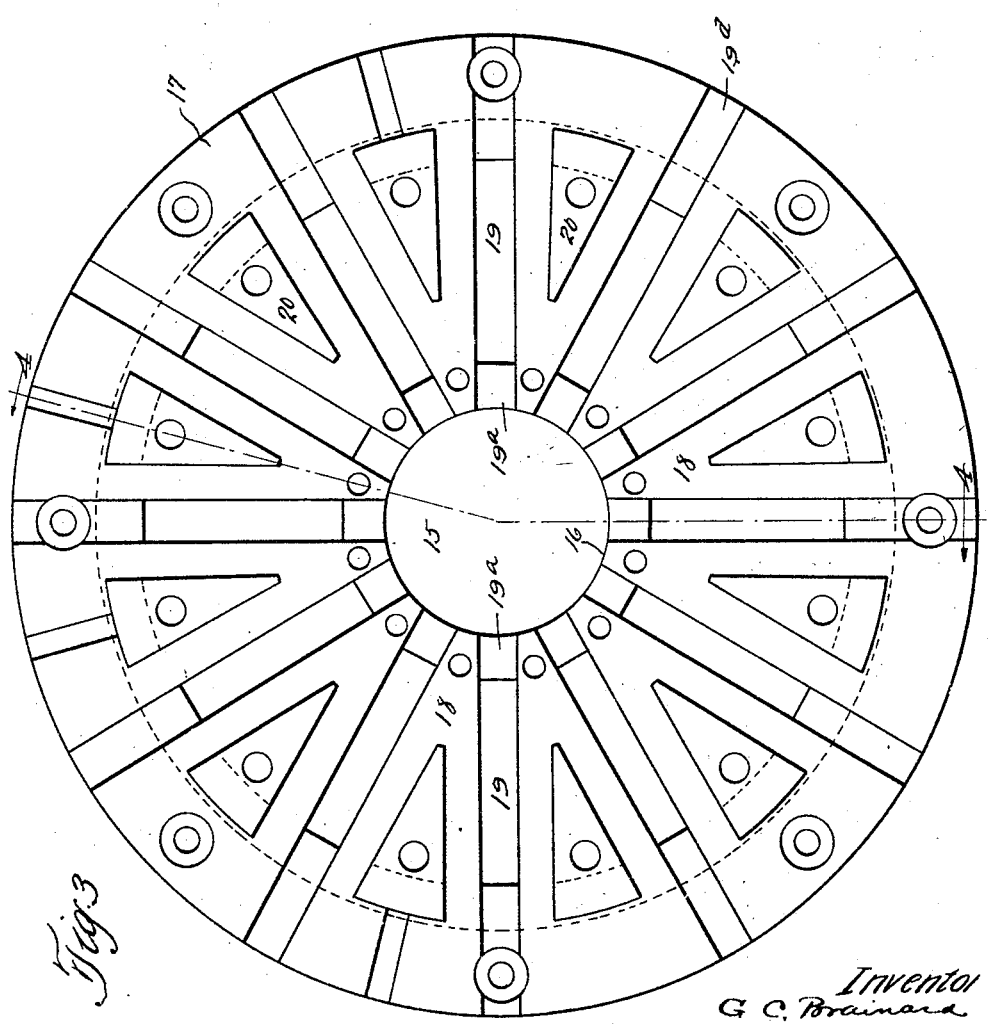
Inventor
G. C. Brainard
By
Attys.

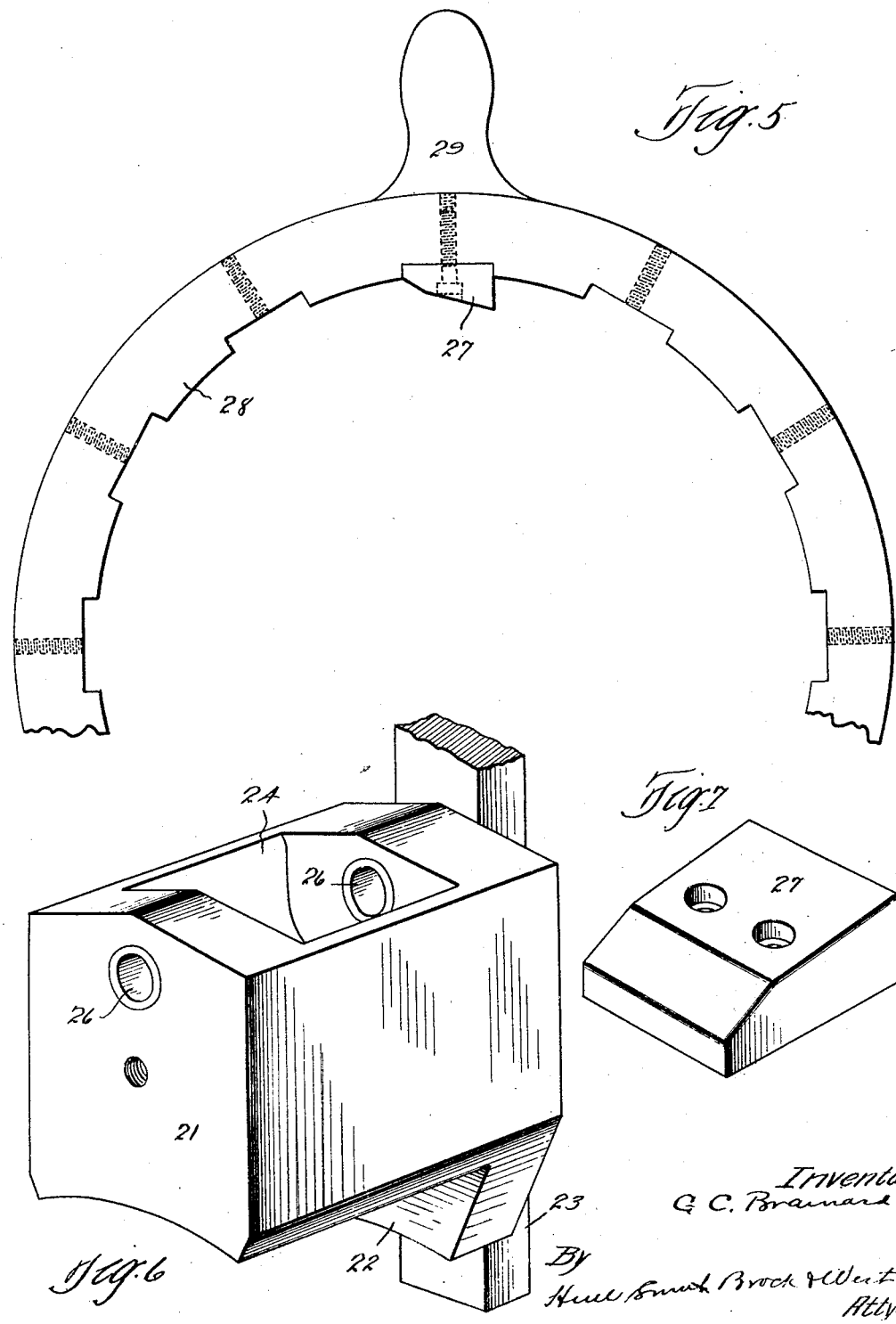

May 26, 1925.
G. C. BRAINARD
APPARATUS FOR SHAPING AND TRUING BRAKE DRUMS
Filed Jan. 7, 1921  5 Sheets-Sheet 5.
1,539,800
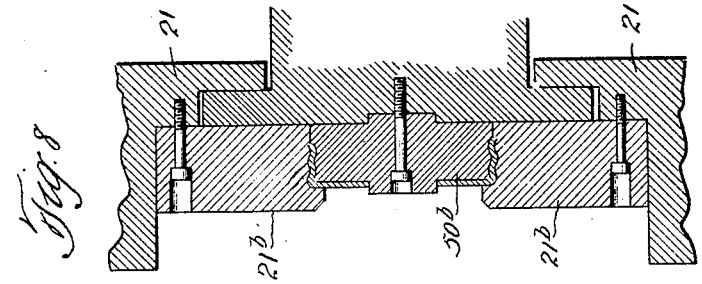
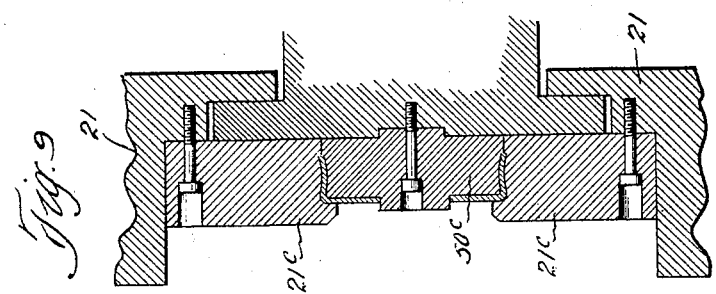
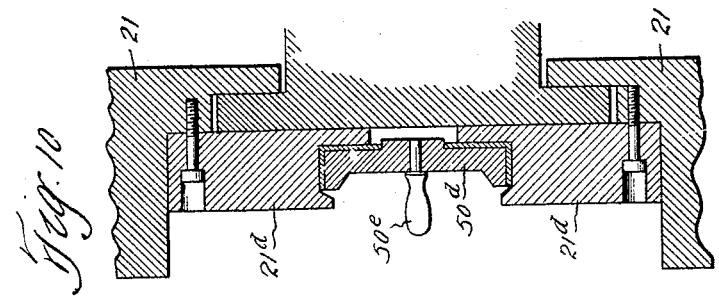
Inventor
G. C. Brainard.
By
Attys.

Patented May 26, 1925.

1,539,800

UNITED STATES PATENT OFFICE.

GEORGE C. BRAINARD, OF CLEVELAND, OHIO, ASSIGNOR TO HYDRAULIC STEEL COMPANY, OF CLEVELAND, OHIO, A CORPORATION OF OHIO.

APPARATUS FOR SHAPING AND TRUING BRAKE DRUMS.

Application filed January 7, 1921. Serial No. 435,654.

*To all whom it may concern:*

Be it known that I, GEORGE C. BRAINARD, a citizen of the United States, residing at Cleveland, in the county of Cuyahoga and State of Ohio, have invented a certain new and useful Improvement in Apparatus for Shaping and Truing Brake Drums, of which the following is a full, clear, and exact description, reference being had to the accompanying drawings.

This invention relates to an apparatus for sizing and shaping brake drums for automobile wheels and more particularly to a compressing device wherein pressure is applied to the periphery and face of the drum for the purpose of shrinking or compressing the same into a definite size and true shape, as in some instances the drum is out of true both circumferentially and also out of plane. In other instances the drum may be oversized, in which event it must be shrunk to the proper size and as before stated, this invention relates to an apparatus for quickly and easily accomplishing these sizing and shaping operations. With these various objects in view and certain others which will become apparent as the description proceeds, the invention consists in the novel features of construction and in the manner of combining or arranging the same, all of which will be fully described hereinafter and set forth in the appended claims.

In the drawings forming a part of this specification, Fig. 1 is a front elevation of the machine embodying one form of my invention; Fig. 2 is a transverse vertical section on the line 2—2 of Fig. 1; Fig. 3 is a face view of the segment plate; Fig. 4 is a sectional view of the same partly in elevation taken on the line 4—4 of Fig. 3; Fig. 5 is a view of the upper portion of the shrinking ring; Fig. 6 is perspective view of one of the shrinker blocks; Fig. 7 is a detail perspective view of one of the shrinking ring wedges; Fig. 8 is a detail sectional view of shrinker blocks with collapsible mandrel for corrugating the flange of the drum; Fig. 9 is a similar view for channel section flange; and Fig. 10 is a similar view with removable mandrel manually manipulated.

Referring to the drawings 11 indicates the main frame comprising the base 12, the upright portions 13 arranged at an angle thereto and the brace webs 14 at the rear of the upright portion and surrounding the upright portion 13 at each side with the base portion 12. Rigidly secured to the front face of the upright portion 13 is the sector plate 15 comprising an inner ring 16 and outer ring 17 and a series of connecting sectors 18 so dimensioned and arranged as to leave radial openings between the sectors, and where the sectors are connected to the inner and outer rings, grooved portions $19^a$ and $19^d$ respectively will be provided. Each sector 18 is formed with an outwardly or forwardly projecting sector 20 considerably smaller than the sector 18 and so positioned to serve as guides for the shrinker blocks 21 arranged between the said guide sectors 20, each shrinker block 21 having a depending portion 22 and an integral guide member 23 which works between the sectors 18 and in the grooves $19^a$ and $19^b$. The shrinker blocks 21 slide upon the sectors 18 and between the sectors 20 and each shrinker block 21 is formed with a recess 24 in the outer end thereof in which turns a roller 25 having its ends journaled in the openings 26 produced in the block, said roller 25 projecting slightly beyond the outer end of said block and is adapted to be engaged by the wedge blocks 27 rigidly connected to the inner face of the shrinking ring 28, said ring 28 resting upon the outer portions of the sectors 18 and embracing the sectors 20 as most clearly shown in Figs. 1 and 2. At its upper end the shrinking ring 28 is formed with an upwardly projecting arm 29 which is shifted from side to side by the hydraulically operated piston 30 and yoke 31, the piston operating in the hydraulic cylinder 32 and the yoke being connected and operated from the second piston 33 also arranged and operated from the cylinder; and the amount of flow can be regulated by means of an adjustable stop 34. The hydraulic cylinder is arranged at the upper end of the upright portion of the main frame and may be of any suitable construction so long as the operation thereof will serve to shift the arm 29 back and forth; and it will be understood when the arm 29 is shifted in the direction indicated by the arrow, the wedge blocks 27 will be forced to ride upon the rollers 25 carried by the shrinker blocks and force the same radially inwardly a definite distance and the brake drum being placed within the said shrinker blocks will be acted upon at all points and shrunk the desired amount and at the same time brought to a perfectly true circle, thereby avoiding the necessity of machining or reshaping the periphery of the drum.

Inasmuch as the brake drums vary considerably in diameter, I provide for such variations by arranging removable shrinker block sections 21ª which are bolted to and therefore constitute a part of the shrinker blocks proper.

In connection with the shrinker blocks I employ a mandrel 50 which is centrally mounted with reference to said shrinker blocks and upon which the brake drum is placed and supported during the shrinking and shaping operations; and in practice I prefer to employ a plurality of knock-out pins working through the mandrel and operated from the hydraulic cylinder 52 suitably mounted at the rear of the main frame. I also provide a sizing and facing mandrel 53 operated by the hydraulic jack 54 and adapted to contact with the front face of the brake drum and hold the same from buckling and also bring said face into a perfectly true plane with relation to the periphery of the drum; and it will be understood that this mandrel 53 will be in position during the shrinking operation and withdrawn immediately afterwards and preceding the operation of the knock-out pins. In Fig. 8 I have shown the shrinker block sections 21ᵇ and the mandrel 50ᵇ of such shape as to provide a corrugated flange upon the brake drum; and it will be understood that in this connection the mandrel 50ᵇ will be made collapsible so that the brake drum with corrugated flange can be removed therefrom. In Fig. 9 the sections 21ᶜ and mandrel 50ᶜ are shaped to provide a channel section flange and in this connection the mandrel 50ᶜ will also be collapsible. In Fig. 10 I have shown a mandrel 50ᵈ provided with a handle 50ᵉ, the brake drum being fitted upon the mandrel and placed between the shrinker blocks 21ᵈ which are shaped somewhat differently from the sections 21 inasmuch as in this instance the face of the brake drum is placed inwardly instead of outwardly and when this manually operated mandrel is employed the knock-out pins and the facing mandrel will not be employed. The manner of operating the shrinker blocks by means of the shrinking ring 28 has already been described and it will be understood that upon the reverse movement of the arm 29 this ring 28 will be moved in the reverse direction carrying with it the wedge blocks and the shrinking blocks will then be expanded to their normal positions by means of the spring 34. The springs 34 are arranged within the radial openings 19 and bear at their inner ends upon the inner ring 16 and at their outer ends are connected cap screws 36 screwed into the inner or rear face of the shrinking block. By means of this construction as the shrinking block is forced inwardly the spring 34 is compressed and as soon as the working pressure is relieved this spring 34 exerts pressure upon the block and moves the same radially outwardly. It will thus be seen that in order to properly size and shape a brake drum which has been previously punched from heavy sheet metal it will only be necessary to arrange the drum upon the proper mandrel, apply pressure thereto by means of the shrinker blocks and facing mandrel and then reverse the movements of said facing mandrel and shrinker blocks and remove the brake drum by means of the knock-out pins in the construction shown in Fig. 2 and remove the same manually in the construction shown in Fig. 10.

In the construction shown in Figs. 8 and 9 it will be understood that the facing mandrel will also be used in connection with the collapsible mandrel and that any suitable knock-out feature can be used in connection with the collapsible mandrels shown in Figs. 8 and 9.

Having thus described my invention what I claim is:

1. The combination with a radially grooved back plate, of a plurality of radially movable sectors and means for moving the same, a centrally disposed mandrel adapted to receive a brake drum, shrinker blocks carried by the movable sectors and engaging the flange of the brake drum and means for engaging the face of the brake drum.

2. The combination with a radially grooved back plate, of radially movable sectors and means for moving the same, a centrally disposed mandrel adapted to receive the brake drum, shrinker blocks carried by the movable sectors and adapted to engage the flange of the brake drum, means for engaging the face of the brake drum and means for disengaging the brake drum from the mandrel.

3. In a device of the kind described, a ring having a lug extending upwardly therefrom, a hydraulically operated piston adapted to operate said ring through a definite number of degrees, a plurality of wedge shaped blocks attached to the inner face of said ring, and a plurality of roller carrying radially movable sectors actuated by the wedges of said ring.

In testimony whereof, I hereunto affix my signature.

GEORGE C. BRAINARD.